United States Patent
Ekpenyong

(10) Patent No.: US 10,485,019 B2
(45) Date of Patent: *Nov. 19, 2019

(54) UPLINK CONTROL SIGNALING FOR JOINT FDD AND TDD CARRIER AGGREGATION

(71) Applicant: Texas Instruments Incorporated, Dallas, TX (US)

(72) Inventor: Anthony Edet Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/645,262

(22) Filed: Jul. 10, 2017

(65) Prior Publication Data
US 2018/0020474 A1  Jan. 18, 2018

Related U.S. Application Data

(63) Continuation of application No. 14/301,126, filed on Jun. 10, 2014, now Pat. No. 9,706,568.

(Continued)

(51) Int. Cl.
*H04W 72/14* (2009.01)
*H04L 5/00* (2006.01)
(Continued)

(52) U.S. Cl.
CPC ........... *H04W 72/14* (2013.01); *H04L 1/1861* (2013.01); *H04L 5/0055* (2013.01); *H04L 5/001* (2013.01); *H04L 5/0035* (2013.01); *H04L 5/143* (2013.01); *H04L 5/1469* (2013.01); *H04W 76/15* (2018.02)

(58) Field of Classification Search
CPC .............................. H04L 5/0055; H04W 72/14
See application file for complete search history.

(56) References Cited

U.S. PATENT DOCUMENTS 9,113,468 B2   8/2015 Kishiyama
2011/0243066 A1  10/2011 Nazar et al.
(Continued)

FOREIGN PATENT DOCUMENTS

CN   101958775 A   1/2011
CN   102468950 A   5/2012
(Continued)

OTHER PUBLICATIONS

LTE Carrier Aggregation between TDD and FDD, Discussion and Decision, 13.1.3GPP TSG RAN Meeting #59, Vienna, Austria, Feb. 26-Mar. 1, 2013 [online] [retrieved Sep. 12, 2014].
(Continued)

*Primary Examiner* — Yemane Mesfin
*Assistant Examiner* — Henry Baron
(74) *Attorney, Agent, or Firm* — Gregory J. Albin; Charles A. Brill; Frank D. Cimino

(57) ABSTRACT

Embodiments of the invention are directed to a method for operating a mobile device including establishing a connection to a first base station designated as a PCell and establishing a connection to a second base station designated as a SCell. When the mobile device receives PDSCH from a TDD SCell in a subframe n, it transmits a HARQ ACK to an FDD PCell in subframe n+4. When the mobile device receives PDSCH in a downlink subframe from an FDD SCell, it transmits a HARQ ACK corresponding to the PDSCH to a TDD PCell in a selected uplink subframe. The selected uplink subframe may be the first valid uplink subframe following the downlink subframe. For example, where the downlink subframe carrying the PDSCH is subframe n, and the selected uplink subframe is subframe n+k, where k≥4.

14 Claims, 5 Drawing Sheets

Related U.S. Application Data

(60) Provisional application No. 61/840,993, filed on Jun. 28, 2013, provisional application No. 61/866,290, filed on Aug. 15, 2013, provisional application No. 61/868,970, filed on Aug. 22, 2013.

(51) Int. Cl.
*H04L 1/18* (2006.01)
*H04L 5/14* (2006.01)
*H04W 76/15* (2018.01)

(56) References Cited

U.S. PATENT DOCUMENTS

| | | |
|---|---|---|
| 2013/0182583 A1 | 7/2013 | Siomina et al. |
| 2013/0315114 A1 | 11/2013 | Seo et al. |
| 2014/0161002 A1 | 6/2014 | Gauvreau et al. |
| 2015/0304087 A1 | 10/2015 | He et al. |

FOREIGN PATENT DOCUMENTS

| | | |
|---|---|---|
| CN | 102577209 A | 7/2012 |
| JP | 2012054711 A | 3/2012 |
| WO | 2012108718 A2 | 8/2012 |
| WO | 2012109195 A2 | 8/2012 |
| WO | WO 2012108718 | 8/2012 |
| WO | WO 2012109195 | 8/2012 |
| WO | 2012128513 A2 | 9/2012 |

OTHER PUBLICATIONS

Office Action in China Application No. 201480035797.7 dated Aug. 25, 2017 (13 pages).

UPLINK CONTROL SIGNALING FOR JOINT FDD AND TDD CARRIER AGGREGATION

CROSS-REFERENCE TO RELATED APPLICATIONS

This application is a continuation of application Ser. No. 14/301,126, filed Jun. 10, 2014, which claims the benefit of U.S. Provisional Patent Application No. 61/840,993, filed on Jun. 28, 2013, titled "Uplink Control Signaling for Joint FDD and TDD Carrier Aggregation," U.S. Provisional Patent Application No. 61/866,290, filed on Aug. 15, 2013, titled "Uplink Control Signaling for Joint FDD and TDD Carrier Aggregation," and U.S. Provisional Patent Application No. 61/868,970, filed on Aug. 22, 2013, titled "Uplink Control Signaling for Joint FDD and TDD Carrier Aggregation" the disclosures of which are hereby incorporated by reference herein in their entireties.

TECHNICAL FIELD

The technical field of this invention is wireless communication such as wireless telephony.

BACKGROUND

A cellular wireless network comprises multiple base stations, where each base station transmits to (downlink or DL) and receives from (uplink or UL) a plurality of mobile users in its coverage area. The explosion in data traffic in wireless cellular networks has created a need for rapid expansion of network capacity to cope with increasing user demand. Carrier aggregation provides one method to increase network capacity. With carrier aggregation, a base station simultaneously transmits data to, or receives data from, mobile user equipment (UE) on multiple carriers in the same or different RF bands. For example, in a cellular system complying with the Third Generation Partnership Project (3GPP) Long Term Evolution (LTE) standards, carrier aggregation has been standardized in LTE Releases 10 and 11 for both intra-band and inter-band operation. The cost of mobile UEs is strongly dependent upon the cost of the RF front end, including the mixers, oscillators and radio amplifier, which is designed to work in a specific RF band(s). To maximize return on investment, mobile UE vendors strive for equipment that can be used in both Frequency Division Duplex (FDD) and Time Division Duplex (TDD) modes as well as in the most widely deployed RF bands across all geographic regions.

On the other hand, the cost of RF spectrum is a significant bottleneck in the deployment of ubiquitous and high data rate wireless communication systems. Cellular network operators acquire RF spectrum based on several factors including the size of allocated spectrum chunks (e.g., higher RF bands are better) and optimized coverage (e.g., lower frequency bands provide better in-building penetration). Furthermore, widespread adoption of a particular band guarantees that there would be mobile devices supporting that band. Based on these factors, a network operator may own spectrum in both FDD and TDD bands and may want to configure carrier aggregation for a UE on both TDD and FDD component carriers.

SUMMARY

The example embodiments described herein are directed to a joint FDD and TDD design that provides carrier aggregation in a wireless communication system. The signaling methodology presented herein may be implemented in an Orthogonal Frequency-Division Multiplexing (OFDM)-based cellular system that operates in FDD and/or TDD modes, such as in an LTE cellular network.

In one embodiment, a method for operating a mobile device is described including establishing a connection to a first base station designated as a primary serving cell (PCell) and establishing a connection to a second base station designated as a secondary serving cell (SCell). The SCell uses a different operating mode than the PCell. The PCell and SCell operating modes are selected from FDD and TDD modes. The mobile device receives subframe scheduling messages from the SCell in a downlink subframe and selects an uplink subframe to send a scheduling message acknowledgement based upon the operating mode of the PCell.

In one embodiment, the PCell operates in FDD mode and the SCell operates in TDD mode. In this configuration, the mobile device receives a Physical Downlink Shared Channel (PDSCH) from the TDD SCell in a subframe n and transmits a Hybrid Automatic Repeat Request acknowledgment (HARQ ACK) to the FDD PCell in subframe n+4.

In another embodiment, the PCell operates in TDD mode and the SCell operates in FDD mode. In this configuration, the mobile device receives PDSCH in a downlink subframe from the FDD SCell and transmits a HARQ ACK corresponding to the PDSCH to the TDD PCell in a selected uplink subframe. The selected uplink subframe may be the first valid uplink subframe following the downlink subframe. For example, where the downlink subframe carrying the PDSCH is subframe n, and the selected uplink subframe is subframe n+k, where k≥4.

The mobile device may operate in a half-duplex TDD mode in which case it uses an uplink/downlink subframe configuration for a TDD PCell when transmitting to an FDD SCell.

BRIEF DESCRIPTION OF THE DRAWINGS

These and other aspects of this invention are illustrated in the drawings, in which.

DETAILED DESCRIPTION

The invention(s) will now be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Deployment Scenario for Joint FDD/TDD Carrier Aggregation

Figure 1:
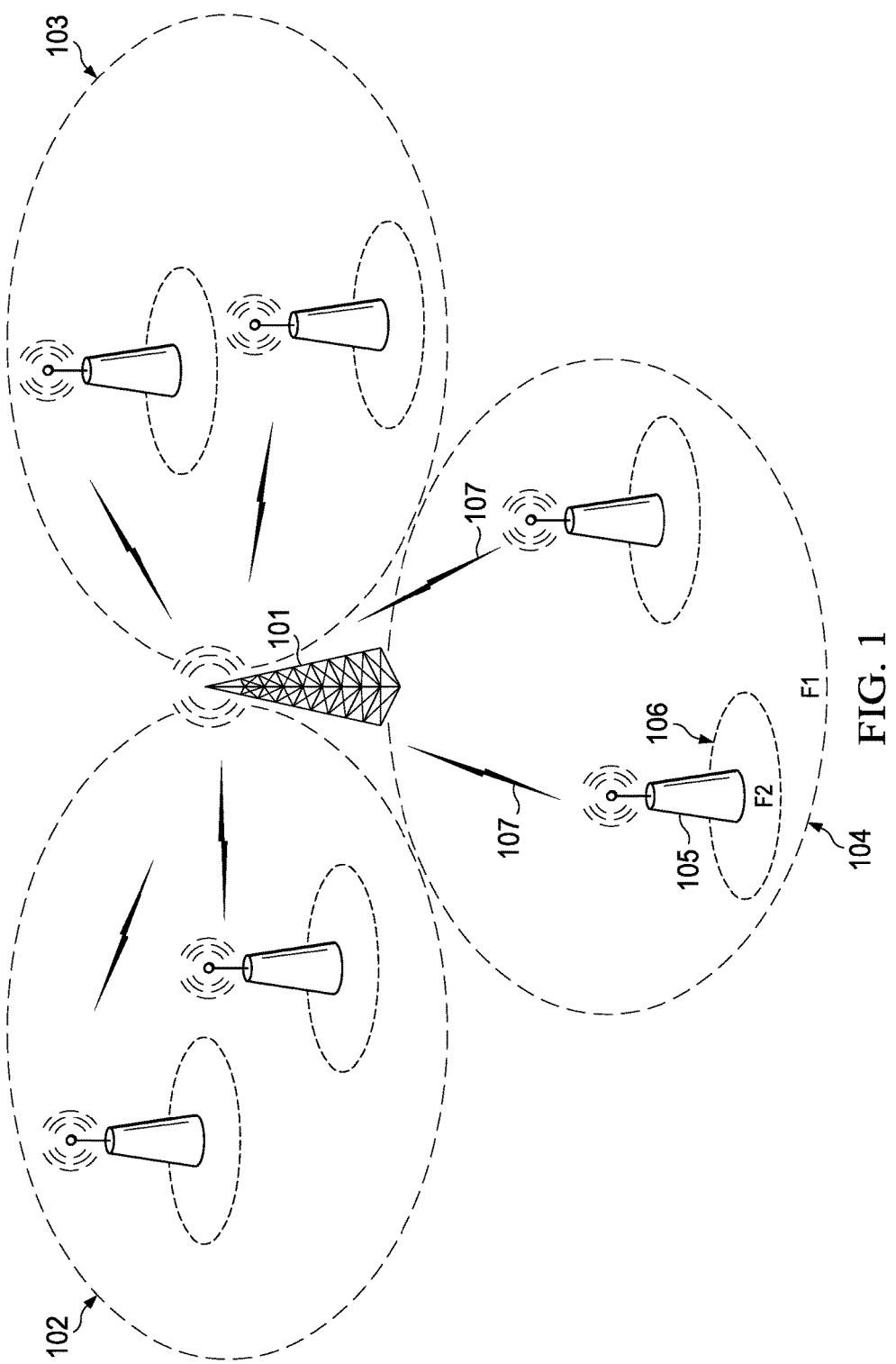
FIG. 1 illustrates a heterogeneous deployment scenario wherein a base station operates in FDD mode and provides macro coverage in a macro cell site having three sectors.

Joint FDD/TDD operation is proposed when a cellular network operator owns both FDD and TDD spectrum in the same geographical area. For example, in a given geographical area, FDD spectrum at 800 MHz and TDD spectrum at 2.6 GHz may be available. FIG. 1 illustrates a heterogeneous deployment scenario wherein base station 101 operates in FDD mode and provides macro coverage in a macro cell site having three sectors 102-104. Base stations 105 are low power nodes that operate in TDD mode in a higher frequency band and control small cells 106. Small cells 106 can be used as capacity boosters to increase throughput at hotspots within the macro-cell sectors. In other scenarios, the macro cell base station 101 may operate in TDD mode and the hotspot base stations 105 may operate in FDD mode. Base stations 101 and 105 may be owned and controlled by a single network operator or by two or more different network operators in a radio access network (RAN) sharing arrangement.

Given this general deployment scenario, there are three modes of joint FDD/TDD operation, namely, a default single mode operation, carrier aggregation, and inter-node aggregation as explained below.

In carrier aggregation (CA), a UE may be configured to receive and transmit data on multiple component carriers (CCs). From the perspective of the MAC layer, data transmission in either DL-only or both DL and UL directions are scheduled per component carrier (CC). As such, each component carrier may be considered as a serving cell each with its own MAC scheduler. In the LTE system, an anchor cell provides a mobility connection to the network and is called the primary serving cell (PCell). Depending on data traffic requirements, the base station may configure additional serving cells known as secondary serving cells (SCells). In one deployment configuration, all primary and secondary serving cells are collocated. In a different deployment configuration, an SCell may be deployed at a different location from the PCell with a backhaul connection 107—preferably with low latency and high throughput—connecting the PCell and SCell locations.

For joint FDD-TDD carrier aggregation operation, the PCell (and possibly some SCells) may be FDD whereas one or more SCells may be TDD or vice-versa. The requirements for joint FDD-TDD carrier aggregation include:

UEs that are capable of multi-mode operation (i.e., operation as either TDD or FDD UEs);

inter-band carrier aggregation capability;

UL carrier aggregation joint operation also requires the UEs to support an independent UL timing advance for different component carriers; and determining the cell to which the UE transmits uplink control information (UCI).

Joint FDD-TDD Carrier Aggregation Design.

Hybrid Automatic Repeat Request (HARQ) scheduling and feedback considerations.

For an LTE system, some existing procedures and DL/UL signaling for carrier aggregation are agnostic as to whether the configured serving cells operate in FDD or TDD modes. A key difference is the HARQ scheduling and HARQ feedback acknowledgments (HARQ-ACK) timelines. By virtue of the paired DL and UL carriers in FDD, a UE may be scheduled for DL assignments and/or UL grants with one-millisecond granularity (i.e., in any subframe). Correspondingly, the HARQ-ACK feedback for a DL assignment in subframe n is transmitted in subframe n+4 for normal HARQ operation. Similarly, the DL HARQ-ACK feedback for an UL grant in subframe n is transmitted on the Physical HARQ Indicator Channel (PHICH) in subframe n+4.

On the other hand, TDD divides a radio frame into DL and UL subframes with a Guard Period to enable transition from DL to UL. This results in restricted opportunities for DL/UL transmission and HARQ-ACK feedback. The LTE system defines a Special subframe which consists of a DL portion (the Downlink Pilot Time Slot or DwPTS), a Guard Period, and an UL portion (the Uplink Pilot Time Slot or UpPTS).

There are seven TDD UL/DL configurations defined in LTE Releases 8-11 as shown in Table 1. The choice of the TDD UL/DL configuration for a given cell depends on several factors, such as the DL and UL traffic rates observed in a cell, the need for good UL coverage (e.g., requiring an UL-heavy UL/DL configuration), and coexistence with other TDD wireless technologies such as Time Division Synchronous Code Division Multiple Access (TD-SCDMA).

TABLE 1

| UPLINK-DOWNLINK CONFIGURATION | DOWNLINK-TO-UPLINK SWITCH-POINT PERIODICITY | SUBFRAME NUMBER/TYPE | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As can be seen in Table 1, when operating in TDD mode, there are limited UL subframes in which to transmit data or uplink control information, such as HARQ-ACK feedback, channel state information (CSI), and scheduling requests. In an UL subframe, the UE may be required to transmit HARQ-ACK feedback for a set of M DL subframes, which is referred to as the Downlink association set.

Table 2 represents the HARQ-ACK DL association set K for TDD UL/DL configurations in an LTE system. The set of possible HARQ-ACK feedback states includes positive acknowledgement (ACK), negative acknowledgement (NACK), and Discontinuous Transmission (DTX). Therefore, given a set of M elements, $\{k_0, k_1, \ldots, k_{M-1}\}$ the UE generates HARQ-ACK feedback in a UL subframe n corresponding to DL subframes $\{n-k_0, n-k_1, \ldots, n-k_{M-1}\}$. The Downlink Control Information (DCI) formats scheduling DL assignments or UL grants on a TDD serving cell contain a Downlink Assignment Index (DAI) field which indicates to the UE the number of DL subframes for which HARQ-ACK feedback is expected. For example, in an UL subframe n for which up to M DL subframes $\{n-k_0, n-k_1, \ldots, n-k_{M-1}\}$ may require HARQ-ACK feedback, the DAI field may indicate that fewer than M subframes were actually scheduled to the UE. A radio frame includes ten subframes labeled as subframes 0 to 9. In Table 2, the subframes in subsequent frames may be labeled as subframes 10 to 19, etc. in order to compute the subtraction $n-k_i$ for i=0 to M−1.

TABLE 2

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

A design constraint for carrier aggregation in current LTE systems is that UCI is only transmitted on the Physical Uplink Control Channel (PUCCH) of the PCell. Therefore, efficient FDD-TDD HARQ-ACK feedback in carrier aggregation depends on which duplex mode is operated on the PCell (i.e., FDD is full-duplex, and TDD is half-duplex). Certain design principles used in current LTE systems may be re-visited for more efficient FDD-TDD operation. These include:

introduce no new TDD UL/DL configurations for joint FDD-TDD carrier aggregation operation; and
transmit UCI only on the PUCCH of the PCell.

In the following sections, different HARQ-ACK feedback designs are considered for the cases where the PCell is operating in either FDD or TDD mode. Although these examples are described using the special case of a single SCell, it will be understood that the design may be generalized to carrier aggregation using multiple SCells.

PCell in FDD Mode, and SCell in TDD Mode.

When the network includes a mix of FDD and TDD cells, one benefit of having the PCell operate in FDD mode is that all subframes of a FDD radio frame are valid UL subframes for UCI transmission. Therefore, when an additional serving cell is configured for TDD, the HARQ-ACK feedback timeline for any TDD UL/DL configuration can be followed for HARQ-ACK feedback on PUCCH because the set of UL subframes for the PCell is a superset of the TDD UL subframes. For single duplex mode carrier aggregation, an LTE Release 10 or Release 11 UE may be configured with one of the following PUCCH schemes: PUCCH Format 1b with channel selection or PUCCH Format 3. The same PUCCH schemes may be configured for FDD-TDD CA as follows 1) If the UE detects a DL assignment on the Physical Downlink Control Channel (PDCCH) or Enhanced Physical Downlink Control Channel (EPDCCH) scheduling PDSCH in a TDD SCell in any one of the M subframes associated with an uplink subframe.
 a) When PUCCH Format 3 is configured, the PUCCH resource is indicated by the Transmit Power Control (TPC) field of the PDCCH scheduling PDSCH on the SCell, where the TPC field indicates one out of four semi-statically configured resources.
 b) When PUCCH Format 1b with channel selection is configured for the case of a single SCell:
  if the PDSCH on the SCell is cross-scheduled from the PCell, up to two resources may be indicated by dynamic PUCCH allocation based on the PDCCH/EPDCCH detected on the PCell;
  otherwise, if the PDSCH is self-scheduled on the SCell, the value of the TPC field of any PDCCH/EPDCCH scheduling PDSCH in any of the M DL subframes associated with the UL subframe indicates one of a set of four pairs of semi-statically configured PUCCH resources.

2) If the UE does not detect a PDCCH/EPDCCH scheduling PDSCH in a TDD SCell in any one of the M subframes associated with an uplink subframe, then the UE transmits on the PUCCH of the FDD PCell in subframe n only if a PDSCH or PDCCH/EPDCCH indicating Semi-Persistent Scheduling (SPS) release is detected in the PCell in subframe n−4.

It is also possible to optimize HARQ-ACK feedback for a TDD SCell when the PCell is operated in FDD mode. Specifically, the HARQ-ACK timing for the PDSCH transmitted on the TDD SCell follows the HARQ-ACK timing on the FDD PCell. Thus, the UE transmits HARQ-ACK feedback in the PUCCH of the PCell in subframe n for a PDSCH detected on a TDD SCell in subframe n−4. When PUCCH Format 3 is configured, the PUCCH resource is indicated by the TPC field of the PDCCH/EPDCCH scheduling PDSCH on the TDD SCell. Similarly, when PUCCH Format 1b with channel selection is configured up to two PUCCH resources corresponding to SCell PDSCH are indicated by the TPC field of the PDCCH/EPDCCH scheduling the PDSCH on the SCell. It is noted that this scheme eliminates the need for a Downlink Association set (i.e., M=1 for any UL/DL configuration). Therefore, there is no need to include DAI field in the DCI formats scheduling a DL assignment or UL grant on a TDD SCell when the PCell operates in FDD mode because the HARQ-ACK timing follows the FDD PCell HARQ-ACK timing.

HARQ-ACK Transmission on PUSCH.

Another consideration is how to multiplex the HARQ-ACK bits on PUSCH when the UE is transmitting on PUSCH. In LTE Release 11 TDD, the number of HARQ-ACK bits transmitted on PUSCH for a configured serving cell depends on the size of the DL association set M or the DAI value contained in the DL assignment or in the UL grant that is transmitted on the PDCCH/EPDCCH. Zero to nine subframes may be indicated by the DAI value in the PDCCH/EPDCCH. In contrast, for an FDD serving cell in LTE Release 11 the number of HARQ-ACK bits is based on the number of configured serving cells and the downlink transmission modes configured for each FDD serving cell.

Figure 2:
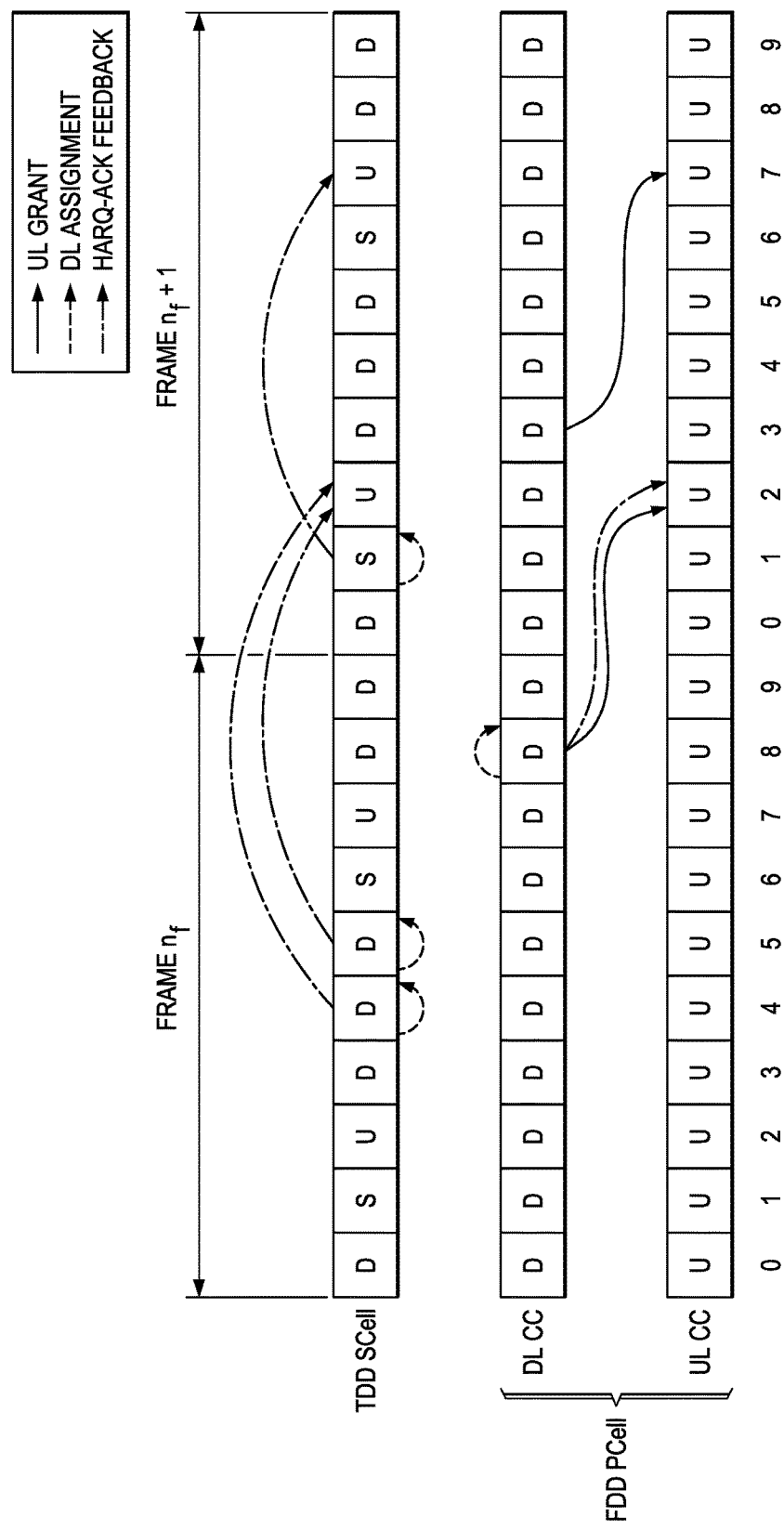
FIG. 2 shows a mobile device scheduled to transmit PUSCH on the FDD PCell in subframe 7 of radio frame $n_f+1$.

FIG. 2 illustrates carrier aggregation with a PCell in FDD mode and an SCell in TDD UL/DL Configuration 2. In the TDD SCell, DL assignments for the SCell in DL subframes 4 and 5 of radio frame $n_f$ are acknowledged (HARQ-ACK feedback) by the UE in UL subframe 2 of radio frame $n_f+1$. The DL assignment for the SCell in Special subframe 1 of radio frame $n_f+1$ is acknowledged by the UE in UL subframe 7 of radio frame $n_f+1$. Conversely, in the FDD PCell, because it has a pair of CCs for DL and UL respectively, each DL subframe n can always be uniquely associated with a corresponding UL subframe that is four subframes later (n+4). For example, a DL assignment in subframe 8 of radio frame $n_f$ is acknowledged in UL subframe 2 of radio frame $n_f+1$. Furthermore, if an UL grant is transmitted in subframe 8 of radio frame $n_f$ in addition to the DL assignment, the UE transmits the HARQ-ACK feedback on PUSCH if the UE is not configured for simultaneous PUCCH and PUSCH transmission. There is no need for a DAI field in FDD since the feedback in an UL subframe n+4 corresponds to the DL assignment transmitted on the PDSCH in DL subframe n.

For joint FDD-TDD carrier aggregation operation, HARQ-ACK feedback on PUSCH may need to take into account HARQ-ACK feedback for FDD cells. However, in current FDD-only carrier aggregation operation, there is no DAI field in the Downlink Control Information (DCI) formats. Therefore, there is no mechanism to indicate that two possible solutions are described below to efficiently support joint FDD-TDD carrier aggregation operation.

Scheme 1: maintain the current design in which there is no DAI field for DCI formats in an FDD cell.

1) For PUSCH transmission on an FDD serving cell:
   a) Arrange the HARQ-ACK bits according to the serving cell index, where 0 is for the PCell, 1 is the first SCell, etc.
   b) For an FDD cell, generate one or two HARQ-ACK bits depending on whether the configured transmission mode supports one or two transport blocks, respectively.
   c) For the $c^{th}$ TDD cell, generate either $B_c^{DL}$ or $2B_c^{DL}$ depending on whether the configured transmission mode supports one or two transport blocks respectively, where $B_c^{DL}=M$.
   In an alternative embodiment, the UE determines the HARQ-ACK feedback for a TDD SCell based on the value of the DAI ($V_{DAI}^{DL}$) in the most recent detected PDCCH/EPDCCH scheduling PDSCH on the SCell for the DL association set $\{n-k_m\}$, m=0, . . . , M−1. Thus, the number of generated HARQ-ACK bits for this TDD cell is $B_c^{DL}=V_{DAI}^{DL}$.
   d) An example is shown in FIG. 2 for an SCell using TDD UL/DL Configuration 2. In UL subframe 2 of radio frame $n_f+1$, the UE shall transmit HARQ-ACK feedback corresponding to detected DL assignments in subframes 4 and 5 of the TDD SCell and subframe 8 of the FDD PCell in radio frame $n_f$.

2) For PUSCH transmission on a TDD serving cell:
   a) If the PUSCH transmission is not adjusted based on a detected PDCCH/EPDCCH with DCI format 0/4, then follow the same bit ordering and number of generated bits as above for PUSCH transmission on an FDD serving cell with $B_c^{DL}=M$.
   b) If the PUSCH transmission is adjusted based on a detected PDCCH/EPDCCH conveying UL DCI format 0/4, then
   i) For the $c^{th}$ TDD cell $B_c^{DL}=W_{DAI}^{UL}$ where $W_{DAI}^{UL}$ is the DAI value in the detected DCI format 0/4.
   ii) In one embodiment, the bit ordering is determined according to the cell index as described above for PUSCH transmitted on an FDD serving cell.
   iii) In another embodiment, the HARQ-ACK bits generated for one or more FDD serving cells are appended to the HARQ-ACK bits for the TDD serving cells (i.e., they are the least significant bits (LSBs)). Therefore, when a UL grant is detected for subframe n on a TDD serving cell, if there was no PDSCH or SPS release DCI in subframe n−4 of the FDD serving cell, the bit mapping is the same as for TDD-only carrier aggregation.

Scheme 2: add a DAI field for DCI formats in an FDD serving cell. The DAI field would indicate to the UE the total number of subframes requiring feedback for any configured TDD serving cell. This solution avoids any possible ambiguity between the base station and the UE in case the UE misses all the scheduling assignments within the DL association set for a UL subframe n. This scheme is also applicable for a TDD PCell and a FDD SCell because an UL grant for the FDD SCell may contain a DAI field to indicate the number of DL subframes of the TDD PCell that require HARQ-ACK feedback.

The length of the DAI field may be two bits, for example, but in other embodiments a one-bit DAI field may be defined. The DAI field is used to indicate to the UE that feedback is required for at least one configured TDD serving cell with $B_c^{DL}=M$. It will be understood that other values are not precluded as the main goal here is to inform the UE when transmitting PUSCH in an FDD cell to include HARQ-ACK feedback for TDD cells.

This scheme is also applicable for a TDD PCell and a FDD SCell because an UL grant for the FDD SCell may contain a DAI field to indicate the number of DL subframes of the TDD PCell that require HARQ-ACK feedback. Therefore, the DAI field may be present for PDCCH/EPDCCH on a FDD serving cell whenever at least one TDD serving cell is configured for a UE.

Alternatively, the DAI field is only present for an FDD serving cell when the subframe is also an UL subframe corresponding to a linked DL association set for at least one of the configured TDD serving cells.

FIG. 2 shows that the UE is scheduled to transmit PUSCH on the FDD PCell in subframe 7 of radio frame nf+1. There is also a DL assignment in subframe 1 (special subframe) of the TDD SCell in the same frame. Even if the UE misses this DL assignment, the value of the DAI field in the UL grant for UL subframe 7 shall indicate to the UE how many DL subframes required HARQ-ACK feedback. This mechanism enables the UE to determine that it failed to detect one or more DL assignments on the TDD serving cell.

PCell in TDD Mode, and SCell in FDD Mode.

An interesting deployment scenario occurs when the PCell is operating in TDD mode and at least one SCell is operating in FDD mode. If the design constraint that PUCCH transmission only occurs on the PCell is followed, this limits HARQ-ACK feedback opportunities for the FDD SCell. Essentially, it forces the FDD SCell to follow the TDD PCell HARQ-ACK feedback timeline. For the case of a DL-only FDD serving cell without a paired UL carrier, this is the default operation. However, when there is a paired UL carrier for the FDD serving cell, it makes sense to consider more efficient means for transmitting HARQ-ACK feedback corresponding to PDSCH on the FDD SCell. This consideration is even more imperative for the following scenario.

Figure 3:
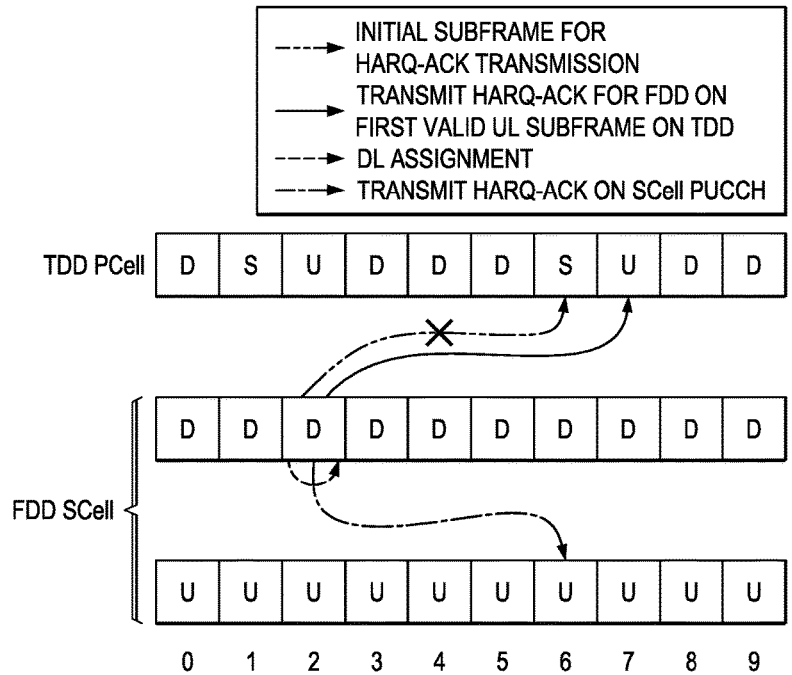
FIG. 3 illustrates the scenario where a mobile device is configured with an FDD SCell and a TDD PCell employing TDD UL/DL Configuration 2.

FIG. 3 illustrates the scenario where a UE is configured with an FDD SCell and a TDD PCell employing TDD UL/DL Configuration 2. Consider the case where a UE is scheduled for PDSCH reception in a DL subframe of the FDD SCell but this subframe is an UL subframe according to the TDD UL/DL configuration of the PCell as illustrated in FIG. 3, for example. Following current FDD procedures the UE should transmit the corresponding feedback in subframe 6, but subframe 6 is a Special subframe for the TDD PCell. One solution to this problem is to configure the UE to transmit HARQ-ACK feedback on the PUCCH of the SCell. There are two possible implementations of this solution:

- simultaneous PUCCH-PUCCH transmission on both PCell and SCell; or
- time-multiplexed PUCCH transmission. For this scheme the UE transmits PUCCH on the FDD SCell only if the UL subframe on the SCell corresponds to a DL subframe on the TDD PCell. Otherwise, if the subframe is an UL subframe for both FDD and TDD serving cells, PUCCH shall be transmitted on the PCell.

An alternative solution would be to schedule the HARQ-ACK feedback corresponding to a DL assignment on the FDD SCell to be transmitted in the first valid UL subframe of the TDD PCell. Specifically, for a PDSCH detected in subframe n on the FDD SCell, the UE shall transmit the corresponding HARQ-ACK feedback in the first valid UL subframe n+k where k≥4. In the example illustrated in FIG. 3, the HARQ-ACK feedback is transmitted in subframe 7 on the PCell.

Considerations for CSI Reporting.

Aperiodic or periodic CSI reporting may be configured in a manner similar to the case of single duplex mode carrier aggregation. For periodic CSI reporting, the priority of CSI reports is based on PUCCH reporting types and serving cell index. When the PCell operates in TDD mode, some restrictions may be placed on the Channel Quality Indicator (CQI)/Precoding Matrix Indicator (PMI) reporting period of a FDD SCell depending on the TDD UL/DL Configuration of the PCell. For example, if the PCell uses UL/DL Configuration 5, reporting periodicity of two-milliseconds may imply frequent dropping of CSI reporting for the FDD SCell. Therefore, if the periodic CSI reporting occasion or subframe coincides with a DL subframe on the TDD PCell, the UE shall not transmit the CSI report.

Considerations on UE Capability.

In general, full duplex capability is required for a UE that supports FDD-TDD carrier aggregation. However, it is possible to allow a half-duplex UE to enjoy some of the benefits of FDD-TDD CA. For example, an LTE Release 11 TDD UE that is Radio Resource Control (RRC)-connected on a TDD serving cell can be configured to receive PDSCH on a secondary serving cell that uses the same TDD UL/DL configuration as the primary serving cell. If the SCell is operating in FDD mode, the UE may be configured to apply the same UL/DL configuration of the TDD PCell.

Figure 4:
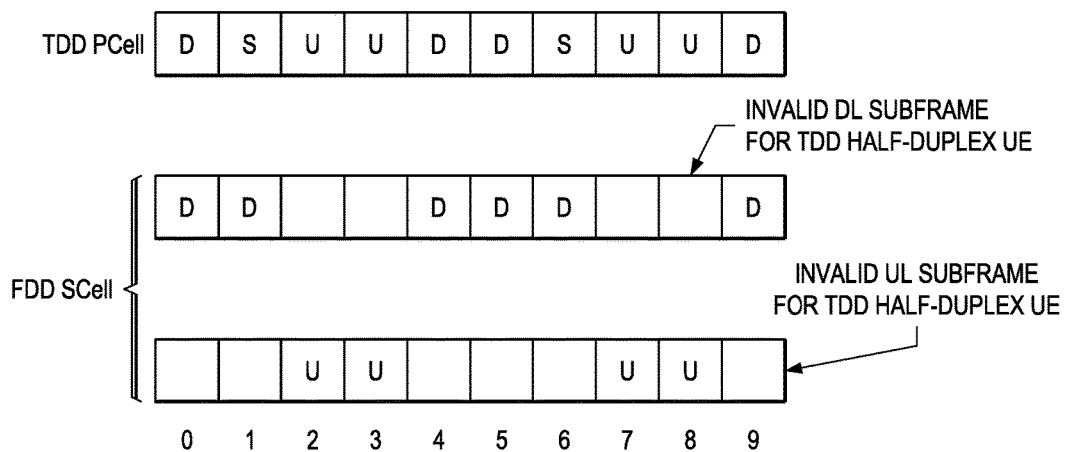
FIG. 4 illustrates use of an FDD secondary serving cell for half-duplex TDD mobile devices employing TDD UL/DL Configuration 1.

FIG. 4 illustrates usage of an FDD secondary serving cell for half-duplex TDD UEs employing TDD UL/DL Configuration 1. As shown in FIG. 4, subframes {2, 3, 7, 8} and {0, 1, 4, 5, 6, 9} are not valid DL or UL subframes respectively for the half-duplex TDD UE on the FDD SCell. Although this subframe restriction may initially seem to be a waste of network resources, it is noted that the base station can assign other UEs (e.g., either FDD UEs or other TDD UEs with full-duplex capability) to the unused resources. Moreover, the performance of a UE with half-duplex capability is similar to TDD-only carrier aggregation wherein the same UL/DL configuration is configured on each serving cell.

In a similar manner, it is possible for a UE that only supports FDD duplex mode to be configured to receive Downlink Shared Channel (DL-SCH) data on the PDSCH of a SCell, where the SCell is actually deployed on a TDD carrier. This scenario is possible when an FDD band overlaps in frequency with a TDD band. For example, 3GPP Band 7 is an FDD band that overlaps in frequency with 3GPP TDD Band 41. An operator with spectrum in this RF region may choose to operate either as a TDD or FDD carrier. When operated as a TDD carrier, an FDD-only UE can be configured to receive data on this carrier by configuring the UE with a restricted set of subframes that matches the DL subframes on the TDD carrier.

Figure 5:
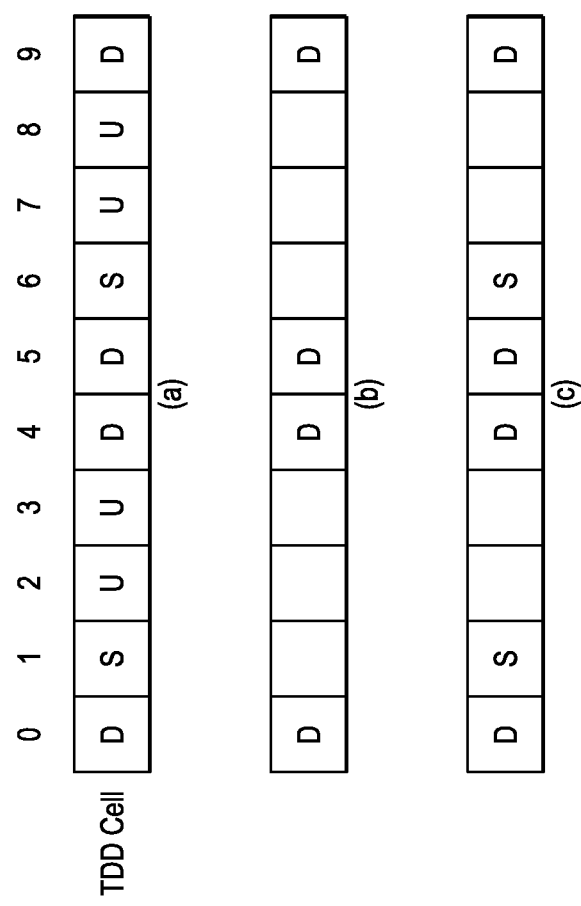
FIG. 5 illustrates usage of a TDD cell as a secondary serving cell for a FDD-only mobile device.

FIG. 5 illustrates usage of a TDD cell as a secondary serving cell for a FDD-only UE. The UE may be configured with a bit map that indicates which subframes it should monitor for DL-SCH data. Frame (a) in FIG. 5 illustrates an example in which a TDD carrier is configured to operate in UL/DL Configuration 1. An FDD-only UE may be configured with a secondary serving cell on this TDD component carrier. Traditionally, the FDD-only UE monitors all subframes in a radio frame for DCI transmitted on the PDCCH or EPDCCH. However, for this TDD carrier, there is no need for the FDD-only UE to waste energy monitoring for DCI on the PDCCH/EPDCCH that cannot be transmitted in subframes {2, 3, 7, 8} because those subframes are designated for UL. Therefore, the FDD UE is configured with a bit map specifying a restricted set of subframes to monitor for DCI.

As illustrated in frame (b) in FIG. 5, the FDD-only UE monitors for DL-SCH data from the SCell on a restricted set of subframes {0, 4, 5, 9}. The bit map designating this restricted set of subframes may be semi-statically configured by RRC signaling.

In a different embodiment of the invention the UE can be configured with an extended bit map indicating not only subframes where to monitor for DCI, but also subframes where a detected DL assignment on the PDSCH is limited to fewer OFDM symbols than the maximum number of OFDM symbols in the subframe. This allows the UE to receive PDSCH on special subframes. For example, when a TDD cell applies normal cyclic prefix in the downlink, Special Subframe Configuration 11 contains 11 OFDM symbols. Therefore, the FDD-only UE is configured to receive a DL assignment in this subframe up to the 11th OFDM symbol.

Frame (c) in FIG. 5 illustrates a restricted set of subframes that includes the Special subframes {1, 6}. An FDD-only UE may be configured to receive data on less than the total number of OFDM symbols in the Special subframes.

In either embodiment (i.e., using a restricted set of subframes that includes just DL subframes or includes DL and Special subframes), the HARQ-ACK timeline should follow the FDD procedure if the UL carrier is FDD. For example, when a DL assignment is received in subframe n, the UE transmits the HARQ-ACK feedback in subframe n+4.

Figure 6:
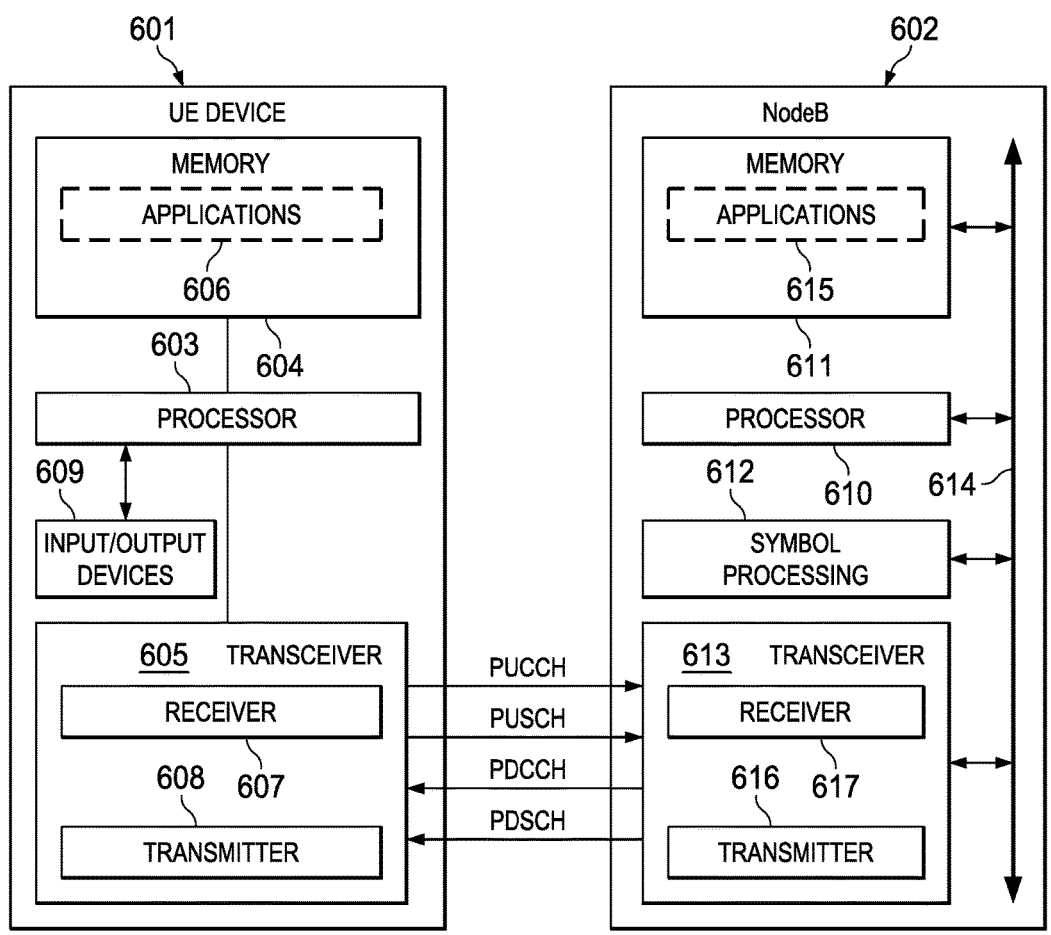
FIG. 6 is a block diagram illustrating internal details of a mobile user equipment and a base station operating in a network system such as illustrated in FIG. 1.

FIG. 6 is a block diagram illustrating internal details of a mobile UE 601 and a base station 603, such as an eNB, operating in a network system such as illustrated in FIG. 1. Mobile UE 601 may communicate with multiple base stations 603 in a carrier aggregation operation. Mobile UE 601 may represent any of a variety of devices such as a server, a desktop computer, a laptop computer, a cellular phone, a Personal Digital Assistant (PDA), a smart phone or other electronic devices. In some embodiments, the electronic mobile UE 601 communicates with eNB 602 based on a LTE or Evolved Universal Terrestrial Radio Access (E-UTRA)

protocol. Alternatively, another communication protocol now known or later developed can be used.

Mobile UE 601 comprises a processor 603 coupled to a memory 604 and a transceiver 605. The memory 604 stores (software) applications 606 for execution by the processor 603. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 601 to transmit UL signals to eNB (base station) 602 periodically or continuously via the transceiver 605.

Transceiver 605 includes uplink logic which may be implemented by execution of instructions that control the operation of the transceiver. Some of these instructions may be stored in memory 604 and executed when needed by processor 603. As would be understood by one of skill in the art, the components of the uplink logic may involve the physical (PHY) layer and/or the Media Access Control (MAC) layer of the transceiver 605. Transceiver 605 includes one or more receivers 607 and one or more transmitters 608.

Processor 603 may send or receive data to various input/output devices 609. A subscriber identity module (SIM) card stores and retrieves information used for making calls via the cellular system. A Bluetooth baseband unit may be provided for wireless connection to a microphone and headset for sending and receiving voice data. Processor 603 may send information to a display unit for interaction with a user of mobile UE 601 during a call process. The display may also display pictures received from the network, from a local camera, or from other sources such as a Universal Serial Bus (USB) connector. Processor 603 may also send a video stream to the display that is received from various sources such as the cellular network via RF transceiver 605 or the camera.

eNB 602 comprises a processor 610 coupled to a memory 611, symbol processing circuitry 612, and a transceiver 613 via backplane bus 614. The memory stores applications 615 for execution by processor 610. The applications could comprise any known or future application useful for managing wireless communications. At least some of the applications 615 may direct eNB 602 to manage transmissions to or from mobile UE 601. eNB 602 may operate in a FDD or TDD mode and may communicate with other base stations (not shown) for carrier aggregation.

Transceiver 613 comprises an uplink resource manager, which enables eNB 602 to selectively allocate uplink Physical Uplink Shared CHannel (PUSCH) resources to mobile UE 601. As would be understood by one of skill in the art, the components of the uplink resource manager may involve the physical (PHY) layer and/or the Media Access Control (MAC) layer of the transceiver 613. Transceiver 613 includes at least one receiver 615 for receiving transmissions from various UEs within range of eNB 602 and at least one transmitter 616 for transmitting data and control information to the various UEs within range of eNB 602.

The uplink resource manager executes instructions that control the operation of transceiver 613. Some of these instructions may be located in memory 611 and executed when needed on processor 610. The resource manager controls the transmission resources allocated to each UE 601 served by eNB 602 and broadcasts control information via the PDCCH. UE 601 may receive TTD UL/DL configuration instructions from eNB 602.

Symbol processing circuitry 612 performs demodulation using known techniques. Random access signals are demodulated in symbol processing circuitry 612. During transmission and reception of voice data or other application data, receiver 617 may receive a random access signal from a UE 601. The random access signal is encoded to request a message size that is preferred by UE 601. UE 601 determines the preferred message size by using a message threshold provided by eNB 602.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A user equipment device, comprising:
 a processor circuit configured to:
  establish a connection to a first base station operating in a Frequency Division Duplex (FDD) mode, the first base station designated as a primary serving cell (PCell); and
  establish a connection to a second base station operating in a Time Division Duplex (TDD) mode, the second base station designated as a secondary serving cell (SCell);
 a receiver circuit configured to receive subframe scheduling messages from the SCell; and
 a transmitter circuit configured to transmit acknowledgment messages to the PCell, the acknowledgement messages corresponding to the subframe scheduling messages received on the SCell.

2. The user equipment of claim 1, wherein the subframe scheduling messages comprise a TDD uplink or downlink configuration, and wherein the acknowledgement messages comprise a Hybrid Automatic Repeat Request acknowledgment (HARQ ACK).

3. The user equipment of claim 1, wherein when the receiver circuit detects a Physical Downlink Shared Channel (PDSCH) from the TDD SCell in a subframe n, the transmitter circuit transmits a Hybrid Automatic Repeat Request acknowledgment (HARQ ACK) to the FDD PCell in subframe n+4.

4. A user equipment device, comprising:
 a processor circuit configured to:
  establish a connection to a first base station operating in a Time Division Duplex (TDD) mode, the first base station designated as a primary serving cell (PCell); and
  establish a connection to a second base station operating in a Frequency Division Duplex (FDD) mode, the second base station designated as a secondary serving cell (SCell);
 a receiver circuit configured to receive Physical Downlink Shared Channel (PDSCH) messages in a downlink subframe from the SCell; and
 a transmitter circuit configured to transmit acknowledgment messages corresponding to the PDSCH messages to the PCell in a selected uplink subframe, wherein the selected uplink subframe is the first valid uplink subframe following the downlink subframe.

5. The user equipment of claim 4, wherein the downlink subframe is subframe n, and the selected uplink subframe is subframe n+k, where k≥4.

6. The user equipment of claim 4, wherein the processor circuit operates in half-duplex TDD.

7. The user equipment of claim 6, wherein the processor circuit applies an uplink/downlink subframe configuration for the TDD PCell to the FDD SCell.

8. A method for operating a mobile device, comprising:
establishing a connection to a first base station designated as a primary serving cell (PCell);
establishing a connection to a second base station designated as a secondary serving cell (SCell), wherein the SCell uses a different operating mode than the PCell;
receiving subframe scheduling messages from the SCell in a downlink subframe; and
selecting an uplink subframe to send a scheduling message acknowledgement based upon the operating mode of the PCell.

9. The method of claim 8, wherein the PCell and SCell operating modes are selected from a Frequency Division Duplex (FDD) mode and a Time Division Duplex (TDD) mode.

10. The method of claim 8, wherein the PCell operates in FDD mode and the SCell operates in TDD mode, the method further comprising:
receiving a Physical Downlink Shared Channel (PDSCH) from the TDD SCell in a subframe n; and
transmitting a Hybrid Automatic Repeat Request acknowledgment (HARQ ACK) to the FDD PCell in subframe n+4.

11. The method of claim 8, wherein the PCell operates in TDD mode and the SCell operates in FDD mode, the method further comprising:
receiving a Physical Downlink Shared Channel (PDSCH) in a downlink subframe from the FDD SCell; and
transmitting a Hybrid Automatic Repeat Request acknowledgment (HARQ ACK) corresponding to the PDSCH to the TDD PCell in a selected uplink subframe, wherein the selected uplink subframe is the first valid uplink subframe following the downlink subframe.

12. The method of claim 8, wherein the downlink subframe carrying the PDSCH is subframe n, and the selected uplink subframe is subframe n+k, where k≥4.

13. The method of claim 8, wherein the mobile device operates in half-duplex TDD.

14. The method of claim 13, wherein the mobile device uses an uplink/downlink subframe configuration for the TDD PCell when transmitting to the FDD SCell.

* * * * *